United States Patent
Oakley et al.

(10) Patent No.: US 6,931,477 B2
(45) Date of Patent: Aug. 16, 2005

(54) METHOD AND APPARATUS FOR PATCHING CODE AND DATA RESIDING ON A MEMORY

(75) Inventors: John Oakley, Round Rock, TX (US); Kevin Traylor, Austin, TX (US); Glen Zoerner, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 400 days.

(21) Appl. No.: 10/334,260

(22) Filed: Dec. 31, 2002

(65) Prior Publication Data

US 2004/0128471 A1 Jul. 1, 2004

(51) Int. Cl.[7] .............................................. G06F 12/00
(52) U.S. Cl. ........................ 711/2; 711/137; 712/205; 712/207; 712/234
(58) Field of Search ................. 711/2, 137; 712/205, 712/207, 234

(56) References Cited

U.S. PATENT DOCUMENTS 5,623,608 A * 4/1997 Ng ............................. 711/137
6,378,068 B1 * 4/2002 Foster et al. ................. 713/1
6,463,549 B1 * 10/2002 Shperber et al. ............. 714/7
2002/0124161 A1 * 9/2002 Moyer et al. ............... 712/234

* cited by examiner

*Primary Examiner*—Mano Padmanabhan
*Assistant Examiner*—Mehdi Namazi
(74) *Attorney, Agent, or Firm*—Randall S. Vaas

(57) ABSTRACT

A method and apparatus for applying patches to a code or data residing on a non-volatile memory device is illustrated. A code residing at a first location in a non-volatile memory can be replaced by a codes residing at a second locations in a memory map. A patching device compares a first address of a first code to an address identified by a pre-fetch instruction. If the first address matches the address identified by the pre-fetch instruction, a pre-fetch abort is issued to facilitate replacing a bad code residing at the first address with a good code. The good code can be pointed to by a vector in a vector table where the address of the vector is dynamically loaded into a program counter.

20 Claims, 6 Drawing Sheets

METHOD AND APPARATUS FOR PATCHING CODE AND DATA RESIDING ON A MEMORY

TECHNICAL FIELD

The present disclosure relates to memory devices, and more particularly, to managing software residing on read only memory (ROM) devices.

BACKGROUND

Memory devices are commonly used in computers and other electronic devices such as phones, personal data assistants, etc, to store a variety of information including data and software programs. Generally, data and software that needs to be stored for long period of time is often stored on non-volatile memory devices such as read only memory (ROM), erasable programmable ROM (EPROM), etc. Specifically, software programs that are designed by the system manufacturer such as operating systems of computers, operating code of wireless devices, etc., are more likely to be stored on such non-volatile memory. Any information stored in non-volatile memory devices is stored on a permanent basis such that even when the device is not activated or provided with power for a long period of time, such information is still preserved. On the other hand special equipment may be required to make changes to the content of non-volatile memory devices generally.

Generally, software programs or data that is stored on non-volatile memory are likely to be of permanent nature; in practice, it is quite often necessary to make changes to such software programs or data. For example, it is possible to find a software bug or virus in a software program stored on a non-volatile memory device. In such a situation, a user of such a non-volatile device will generally have to re-write the entire program on the non-volatile memory. Making such changes to information stored on non-volatile memory devices is especially difficult when such devices are already installed on a large number of user equipments. For example, if a number of wireless phones with operating code on a ROM of such wireless phones are already used by a number of users and if a situation arises when part of such operating code needs to be changed, it will be necessary for a manufacturer of such wireless phones to recall or the phones and make changes to their operating code, or they will have to issue new wireless phones to all the users with the corrected code.

BRIEF DESCRIPTION OF THE DRAWINGS

The present patent is illustrated by way of examples and not limitations in the accompanying figures, in which like references indicate similar elements, and in which.

DETAILED DESCRIPTION OF THE PREFERRED EXAMPLES

Although the following text sets forth a detailed description of numerous different embodiments of the patent, it should be understood that the legal scope of the patent is defined by the words of the claims set forth at the end of this patent. The detailed description is to be construed as exemplary only and does not describe every possible embodiment of the patent because describing every possible embodiment would be impractical, if not impossible. Numerous alternative embodiments could be implemented, using either current technology or technology developed after the filing date of this patent, which would still fall within the scope of the claims defining the patent.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Computers or devices that use non-volatile memory to store either a code or a data may need changes made to such code or data from time to time. Because it is difficult to change a code in a non-volatile memory without using special devices, a patching device is provided that allows a part of a non-volatile memory to be substituted by another part of volatile or non-volatile memory during real time operation. The addresses of the code or data on the non-volatile memory that needs to be substituted are stored on registers of the patching device. The patching device illustrated by the example described herein pre-fetches an instruction to see if the instruction is accessing either data or code on non-volatile memory that may need to be substituted. If the patching device determines that such a substitution is necessary, it issues a pre-fetch abort instruction and loads a data bus with an instruction to access data or code from a different location.

Figure 1:
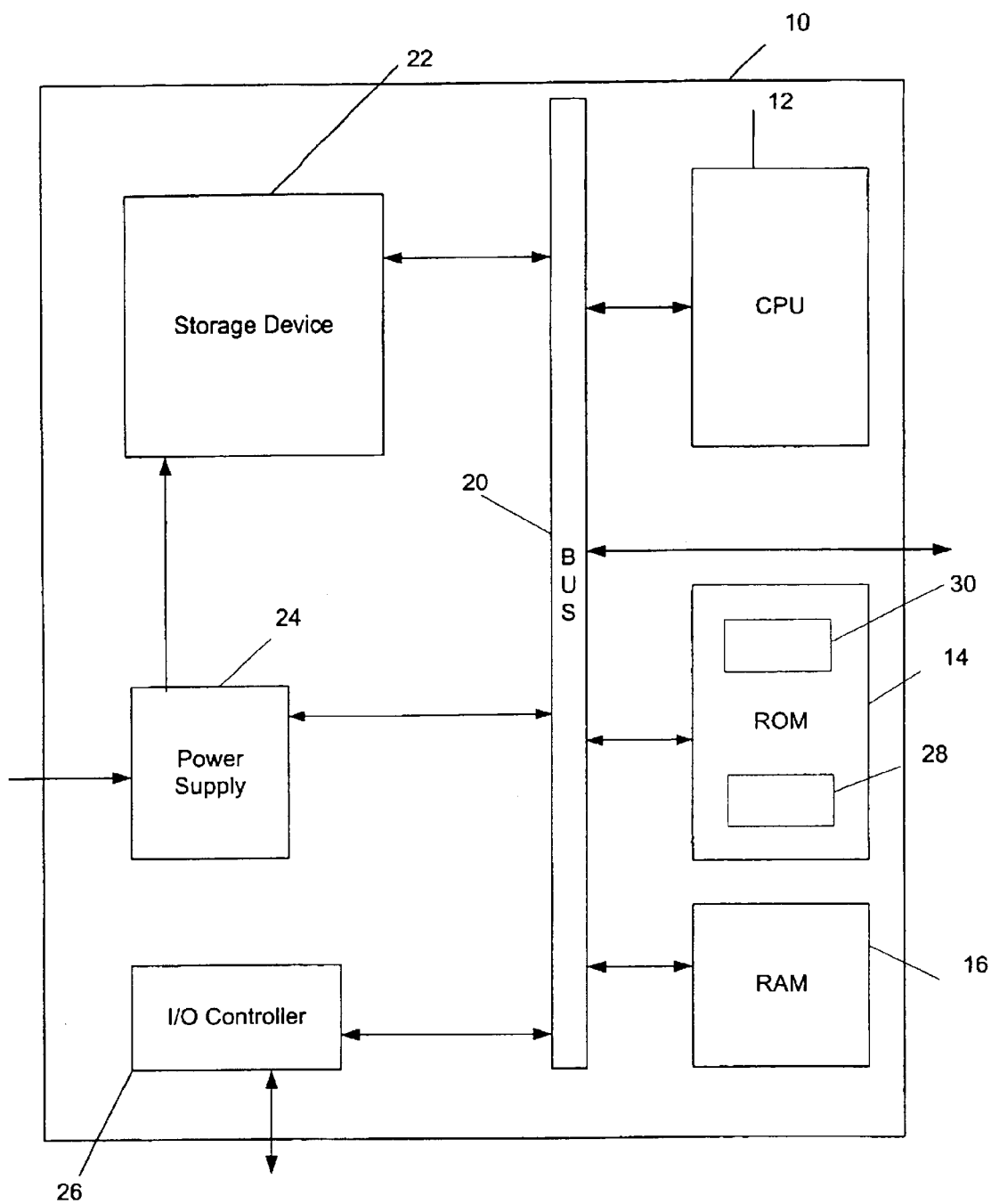
FIG. 1 is a block diagram of an example computer which may use a non-volatile memory

FIG. 1 illustrates block diagram of an example computer 10. As used herein, the term "computer" refers to any device (e.g. portable computer, laptop computer, a personal data assistant (PDA), a desktop computer, a wireless phone, a server, etc.) that employs any type of non-volatile memory. The computer 10 of the instant example contains many conventional hardware components commonly used in computers. For example, as shown in FIG. 1, the computer 10 includes a central processing unit (CPU) 12, a non-volatile memory in the form of read only memory (ROM) 14, a random access memory (RAM) 16, a communications bus 20, a storage device 22, a power supply 24 and an input/output (I/O) controller 26. Even though the instant example of the computer 10 shows these components internal to the computer, a person of ordinary skill in the art will appreciate that some of these components can be external to the computer 10, or some of these components may not be used by a computer at all. For example, an alternate example of a computer 10, used on a wireless phone device may not contain any storage device 22.

The non-volatile memory 14 of the example computer 10 may be of any alternate form such as a flash memory, an EPROM memory, etc. As shown in FIG. 1 the ROM 14 may contain part(s) or all of a code 28, such as the operating system code for the computer 10, etc. Alternatively, the non-volatile memory 14 may also contain data 30 used by the computer 10. The code 28 may be provided on the computer 10 by a manufacturer of the computer 10, or it may be provided by a vendor other than the manufacturer of the computer 10. Generally, the code 28 does not contain any software bugs or viruses in it, however, in a particular implementation of the computer 10, the code 28 may contain one or more software bugs or viruses that needs to be fixed. Alternatively, the data 30 contained on the non-volatile memory also may need to be updated for any of a number of reasons, including for an efficient use of the computer 10.

Figure 2:
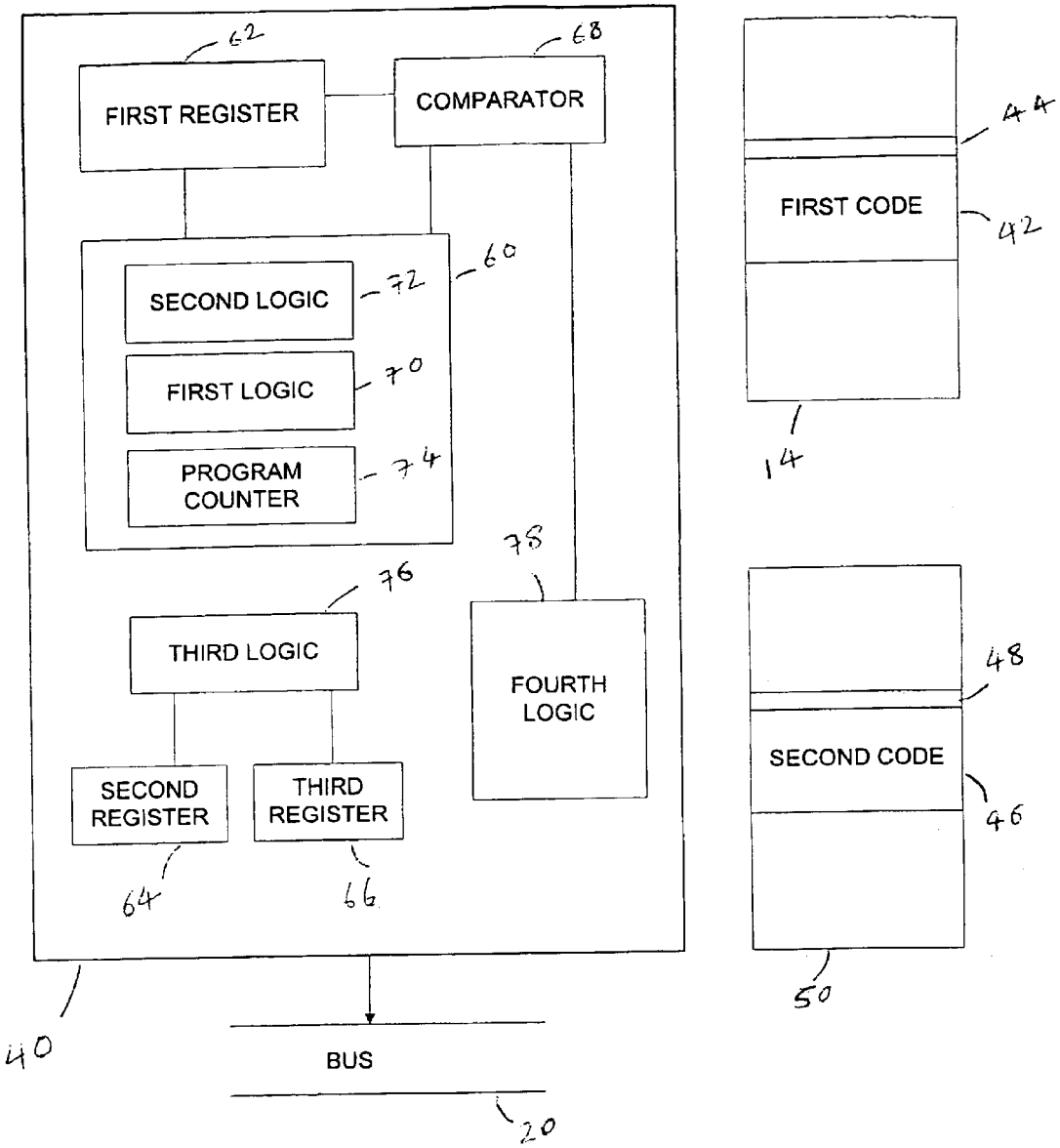
FIG. 2 is a block diagram of an example apparatus used to patch a part of a non-volatile memory.

FIG. 2 is a block diagram of an example patching device 40 used to patch a part of the code 28 contained on the non-volatile memory 14, or to patch a part of the data 30 contained on the non-volatile memory 14. The patching device 40 may be installed such that it is internal to the computer 10 or it may be external to the computer 10. The patching device 40 may also utilize one or more components of the computer 10, such as the RAM 16, the communications bus 20, etc.

The exemplary patching device 40 is used to patch a first code 42 contained at a first address 44 in the ROM 14 with a second code 46 contained at a second address 48 in a patch memory 50. The patch memory 50 may be located on the patching device 40, or alternatively, the patch memory 50 may be contained in the RAM 16 of the computer 10. The exemplary patching device 40 includes a processor 60, a first register 62, a second register 64, a third register 66, and a comparator 68. The processor 60 includes a first logic circuit 70, a second logic circuit 72 and a program counter 74. The patching device 40 further includes a third logic circuit 76 and a fourth logic circuit 78.

Figure 3:
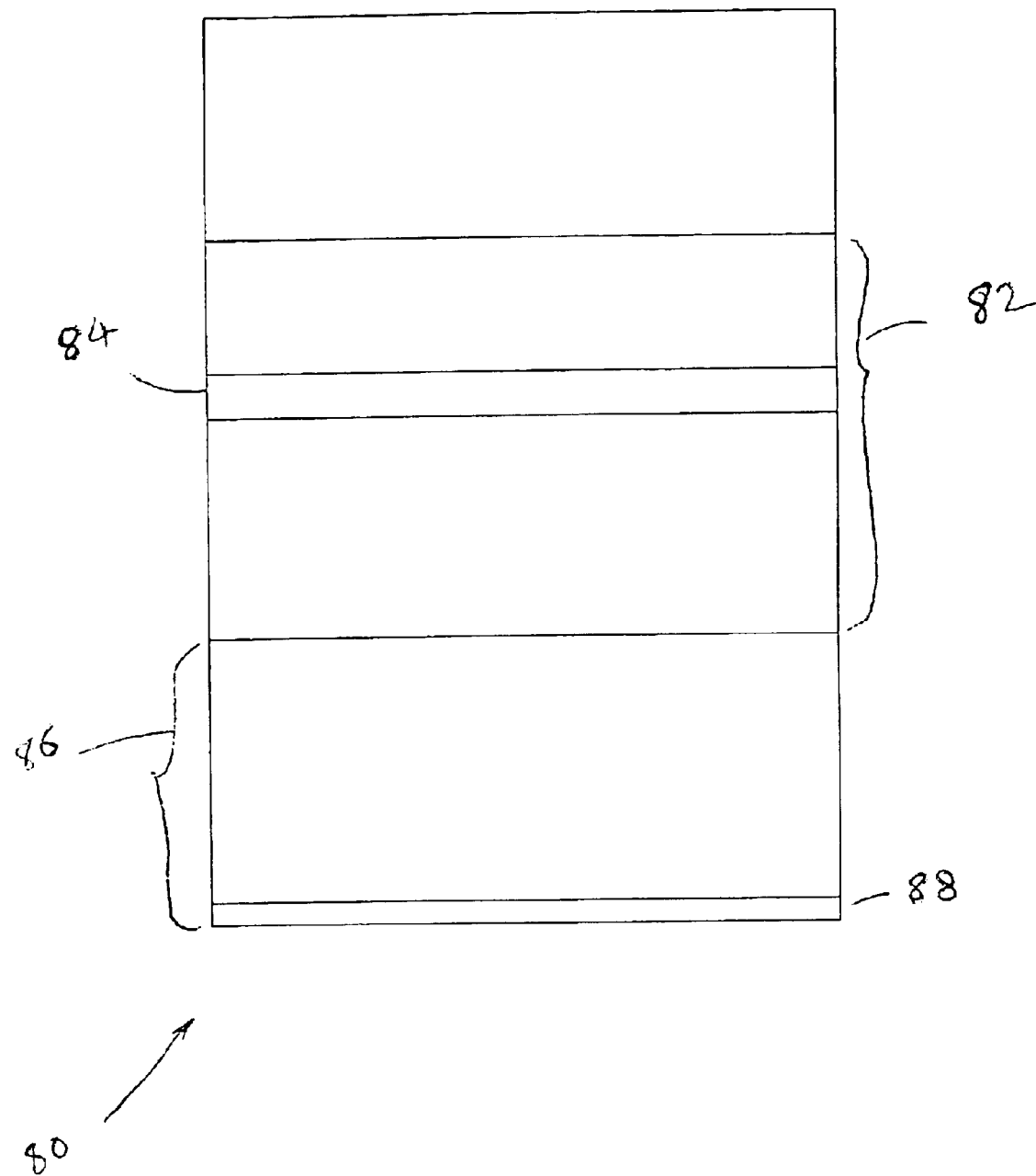
FIG. 3 is an example memory section containing a vector table used in a method used to patch part of a non-volatile memory.

FIG. 3 illustrates a memory section 80 containing a vector table 82, where the vector table 82 is used to contain a plurality of vectors including a first vector 84. First vector 84 contains the second address 48 of the second code residing on the patch memory 46. The vector table 82 may be located on the ROM 14, on the RAM 16, or on any other memory device used on the computer 10. The address of the first vector 84 is defined using a vector table offset 86 that indicates an offset of the vector table 82 from a base 88 of the memory section 80, and a vector index 90 that specifies an offset of the first vector 84 within the vector table 82.

Referring back to FIG. 2, the processor 60 used in the patching device 40 may be any of the popular processors including a complex instruction set code (CISC) type of processor, a reduced instruction set code (RISC) type of processor, etc. The illustrated patching device 40 uses an ARM7TDMI-S processor, which is a low-power 32 bit RISC processor, as the processor 60. An ARM7TDMI-S processor is an advanced RISC machine (ARM) type of processor which is generally used in pagers, wireless handsets, personal data assistants (PDA), digital cameras, etc. An ARM7TDMI-S processor includes an integer core with a three-stage pipeline for processing RISC instructions. An ARM7TDMI-S processor also allows use of both an ARM instruction set as well as a thumb instruction set, as well as a combination of the ARM instruction set and the thumb instruction set. An example of an operation of the ARM7TDMI-S processor used in the patching device 40 is further described in FIG. 5 below.

The first register 62 is used to store the first address 44 of the first code 42. Alternately, if the patching device 40 is used to patch the part of the data 30, the first register 62 may be used to store the first address of the part of the data 30. For example, when a user determines that the first code 42 residing on the ROM 14 contains a software bug or a virus and needs to be replaced by the second code 46, or for any other reason the first code 42 needs to be replaced by the second code 46, the user stores the location of the first address 44 into the first register 62. The first register 62 may be designed using any of the standard register design technology, which is well known to those of ordinary skill in the art. Depending on the type of the processor 60 used in the patching device 40, the first register 62 can store a 32 bit address, a 64 bit address, etc. In the illustrated patching device 40, because a 32-bit ARM7TDMI-S processor is used as the processor 60, the first register 62 is capable of saving a 32 bit address.

The second register 64 is used to store the vector table offset 86 and the third register 66 is used to store the vector index 90. The comparator 68 is used to compare an address of a code being executed by the CPU 12, such as the first code 42, with the content of the first register 62. The operation of the comparator 68 is further described below in FIG. 4.

The first logic circuit 72 is used to load the first vector 84 into the program counter. The second logic circuit 72 reads the second address 48 of the second code 46, which is stored in the first vector 84. As described in FIG. 4 below, the third logic circuit 76 uses the values of the vector table offset 86, the base 88 and the vector index 90 to calculate the first vector 84. When the comparator 68 determines that an address of an instruction fetched from the data bus 20 matches the first address 44, the fourth logic 78 overwrites the data bus 20 with a command to load the program counter 74 with a value of the first vector 84. The operation of various logic circuits within the patching device 40 is further described in FIG. 4 below.

Figure 4:
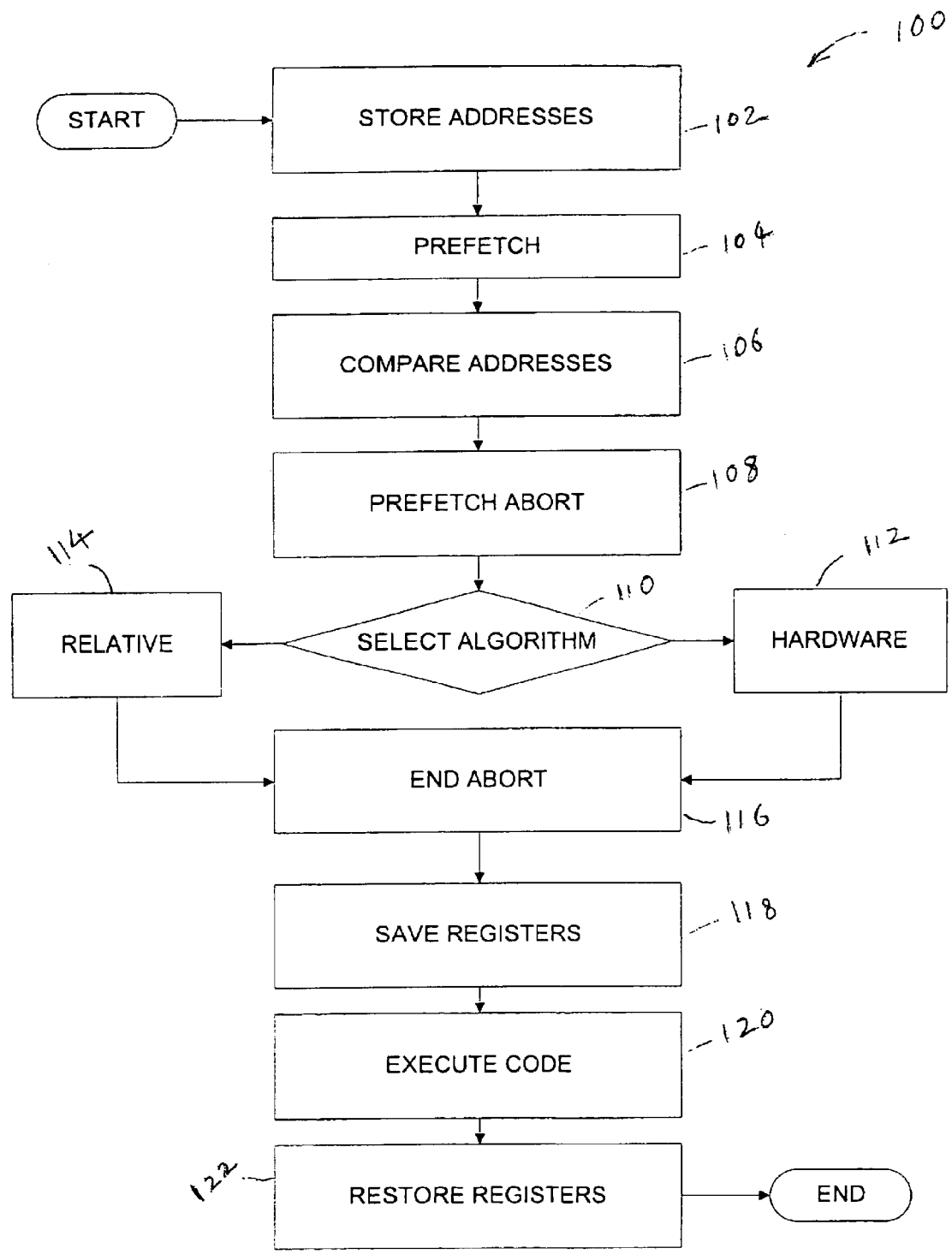
FIG. 4 is a flowchart illustrating an example method used to patch part of a non-volatile memory.

FIG. 4 is a flowchart illustrating an example patching method 100 used to patch a part of a non-volatile memory such as the ROM 14. The patching method 100 allows a user to patch a part of a non-volatile memory using a patching device that uses a pre-fetch cycle to get either an opcode or a data from a data bus connected to a CPU of a computer. Using a pre-fetch cycle allows the patching method 100 to recognize an address of an opcode that will be executed by a CPU a few cycles in advance and to insert a pre-fetch abort instruction onto the data bus if such an address of the opcode points to an address of a bad code, or to an address of a bad data.

At a block 102 a user of the patching device 40 stores an address of a bad code that needs to be replaced with another code onto the first register 62. For example, the first address 44 of the first code 42 may be stored in the first register 62. At this point the patching device continuously monitors the data bus 20.

The data bus 20 carries instructions and data from various components within the computer 10 as well as from peripheral devices attached to the computer 10. For example, an instruction by the I/O controller 26 may be transmitted to the CPU 12 requesting data. Similarly, the data bus 20 also carries instructions from the CPU 12 to other components. An example of such an instruction may be a request to fetch certain content from the ROM 14 at a given address identified in such an instruction.

Instructions to and from the CPU 12 may be in a variety of formats commonly used by computers. For example, an instruction from the CPU 12 to ROM 14 may contain an opcode and an operand, where the opcode represents the actual instruction, and the operand contains any associated data, such as a reference pointer or a discrete value. For example, in an instruction from the CPU 12 to read a content from the ROM 14, the opcode of such an instruction may contain the actual instruction to read a content of ROM 14 and the operand may be the address of a location in the ROM 14.

A computer may also use a pre-fetch queue to manage instructions. For example, the CPU 12 may read a number of instructions ahead of a time when such an instruction is to be executed. A computer may use such a pre-fetching algorithm to improve performance by making a series of next instructions internally available.

In one particular variation of a pre-fetching algorithm, a CPU may pre-fetch just the opcode portion of compute instructions, but not the operand portion. An exemplary implementation of the patching device 40 uses similar pre-fetching algorithm in monitoring the data bus 20. Referring to FIG. 4, at a block 104, the patching device 40 pre-fetches an opcode of an instruction to determine if such an instruction is directed to reading data from the ROM 14. If the instruction is found to be for reading content from the ROM 14, at a block 106, the patching device 40 compares the address contained in such an instruction to the content of the first register 62 using the comparator 68.

If the comparator 68 finds an address of an instruction fetched from the data bus 20 to be equal to the content of the first register 62, at a block 108, the patching device 40 inserts a pre-fetch abort instruction onto the data bus 20. Because the patching device 40 uses a pre-fetch to read instructions, it recognizes a few cycles ahead of an actual operation of reading data from the ROM 14 that such an operation is to be performed. The pre-fetch abort instruction issued by the patching device 40 prevents content of the ROM 14 from being read by the CPU 12. Thus, for example, if the first address 44 is stored in the first register 62, whenever the patching device finds an instruction to read content of the first address 44, it will issue a pre-fetch abort to prevent such a reading of the content of the first address 44.

A pre-fetch abort instruction generates an exception to the processor 60 of the patching device 40. Depending on a type of the pre-fetch abort instruction, at a block 110, the patching device 40 determines what instruction to write to the data bus 20. For example, in a particular implementation, at a block 112 the patching device may load the data bus 20 with an instruction to read data from a fixed location within the ROM 14 or the RAM 16. This method of patching is referred to as hardware accelerated patching.

In an alternate implementation, at a block 114 the patching device 40 may load the data bus 20 with a second instruction to fetch data from the second address 48 using a relative opcode patching method. The functioning of the relative opcode patching method 114 is further described in FIG. 5. At a block 116, the pre-fetch abort is teminated and the data bus fetches the content from an address specified either by the hardware accelerated patching or by the relative opcode patching method.

Whether the patching device 40 uses the relative opcode patching method or the hardware accelerated patching, it is necessary that the first instruction executed by the good code should be such that when the execution of that code is complete, the next instruction is fetched from a location immediately following the first code 44. For example, if relative opcode patching method is used so that the data bus 20 is loaded to fetch content from the second address 48, the code stored at the second address 48 should be such that when the execution of the second code 46 is complete, an instruction stored at a location immediately following the first code 42 is fetched.

Therefore, at a block 118, the patching device 40 saves content of various status registers used by the CPU 12 in a location in RAM 16 or in a number of temporary registers provided by the patching device 40. The content of various status registers is used to re-establish the CPU 12 in a condition in which it was prior to execution of the second code 46.

At this point, the CPU 12 will execute the second code 46, as shown by a block 120. At the completion of execution of the second code 46, the second code 46 must ensure that all status registers of the CPU 12 are restored in a condition such that the normal execution of code at the end of the first code 42 is not affected. At a block 122 such status registers of the CPU 12 are restored to its original condition. At this point the CPU 12 continues its normal execution of the code from the ROM 14. Thus, at a block 124, the CPU executes a code from the ROM 14 that follows the first code 42.

Figure 5:
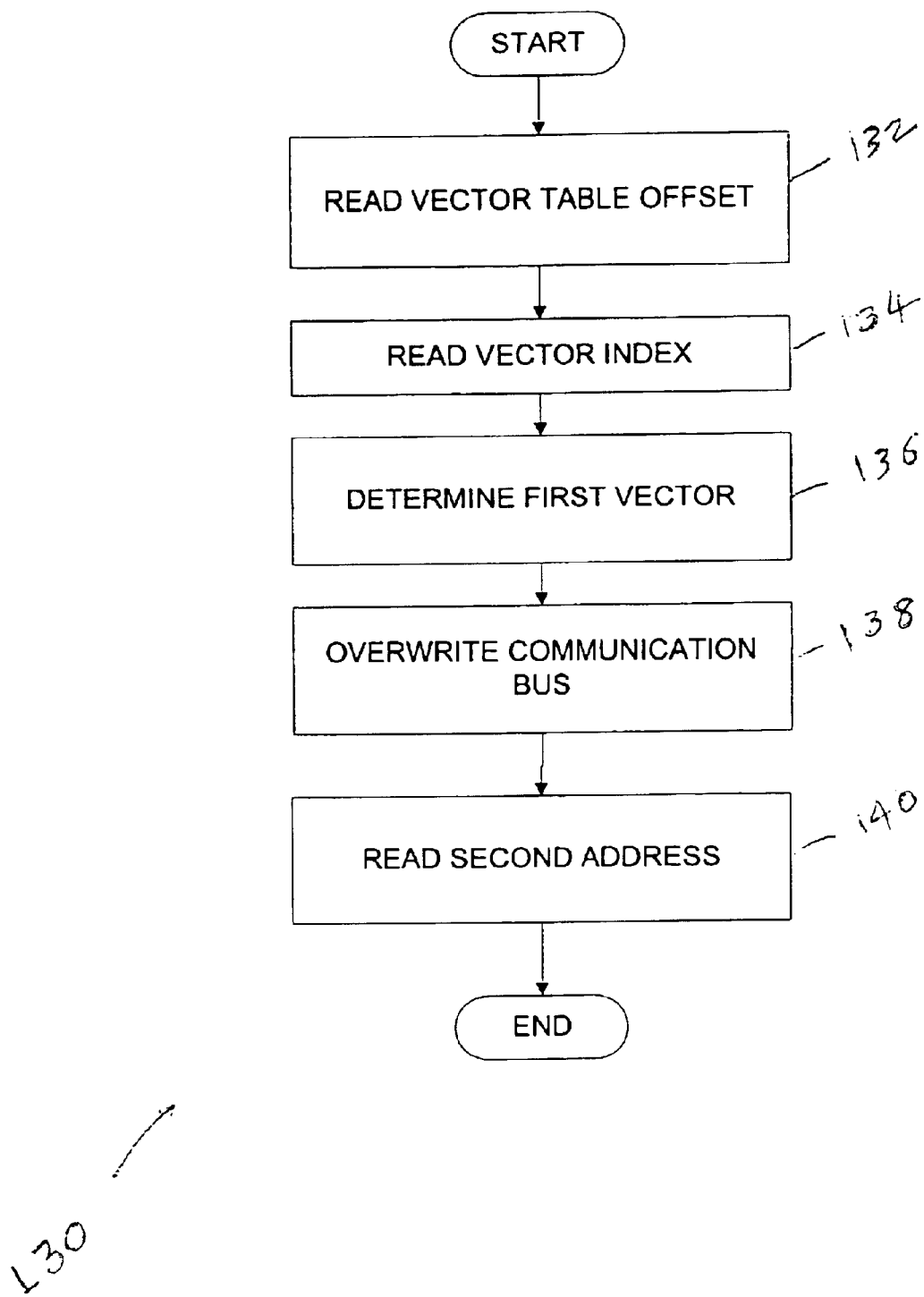
FIG. 5 is a flowchart illustrating a relative opcode patching method used to patch part of a non-volatile memory.

FIG. 5 illustrates an exemplary flowchart 130 to implement the relative opcode patching method that may be used at the block 114 of FIG. 4. Relative opcode patching method allows the patching device 40 to replace a code or a memory patch of the ROM 14 with code or data located at a different location in the RAM 16. Relative opcode patching method uses various vectors from the vector table 82 to get an address of a good code that will replace a bad code in the memory. Alternatively, the vector table 82 may also be used in a relative opcode patching method to get an address of a good data that will replace bad data.

Now referring to FIG. 5, at a block 132, the patching device 40 reads the vector table offset 86 from the second register 64. As explained above, the vector table offset 86 indicates an offset of the vector table 82 from a base 88 of the memory section 80. Next, at a block 134, the patching device 40 reads the vector index 90 from the third register 66. As explained above, the vector index 90 specifies an offset of the first vector 84 within the vector table 82. Using the values of the vector table offset 86 and the vector index 90, at a block 136, the patching device 40 determines a value of the first vector 84.

It can be seen that using such relative opcode patching allows a number of different values to be assigned to the first vector 84. Subsequently, each of the various values assigned to the first vector 84 corresponds to a different location at which a good code may be located on the memory. Therefore a good code located at a number of locations can be used to replace a bad code in the ROM 14. For example, if it is possible to assign sixty four different values to the first vector 84, then sixty four unique good codes can be used to replace the first code 42.

Figure 6:
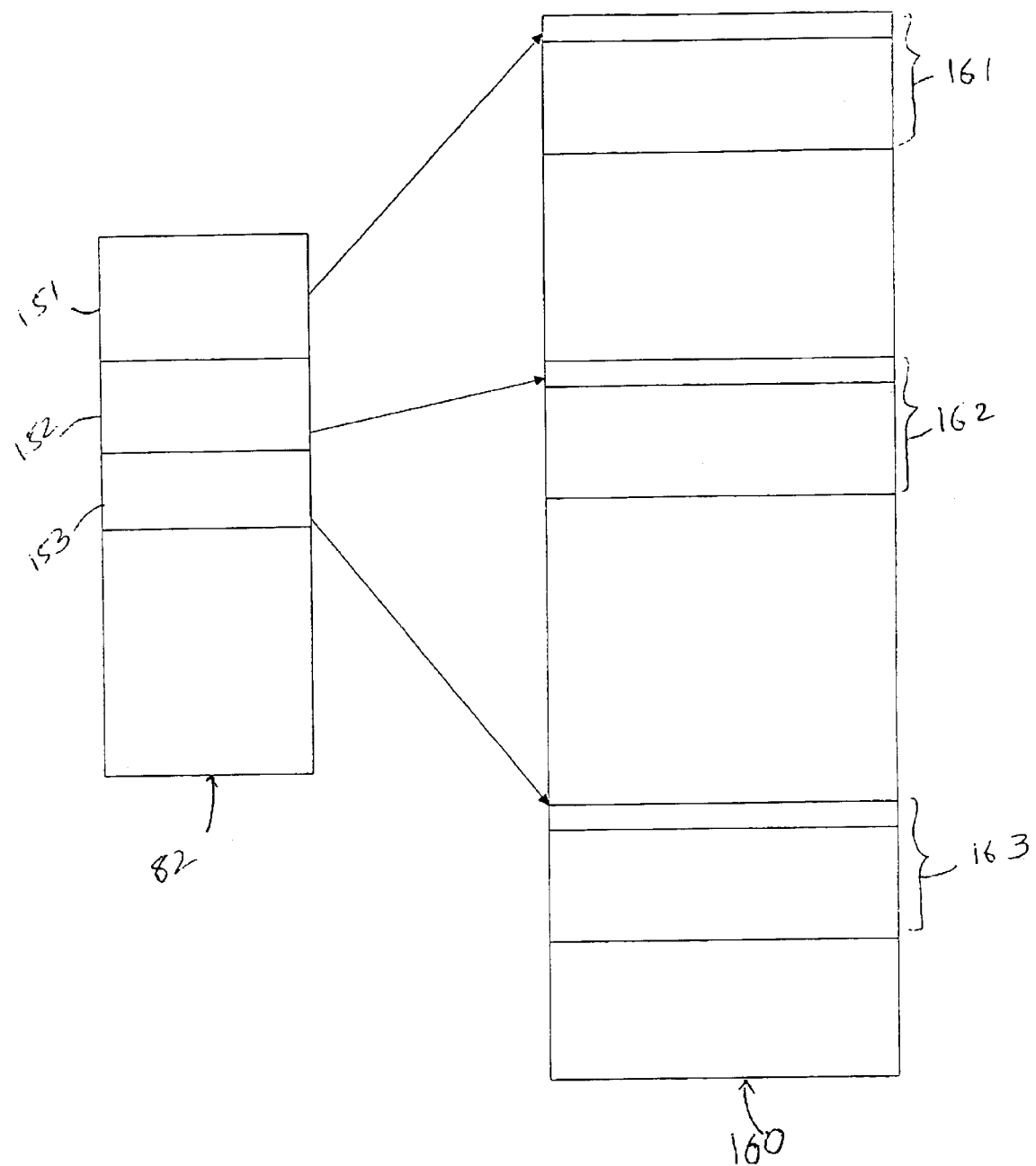
FIG. 6 is an example vector table used by a relative opcode patching method used to patch part of a non-volatile memory.

Such use of a multiplicity of good codes 160 is illustrated in FIG. 6. FIG. 6 also illustrates a particular example of the vector table 82 which may be located at any location in the memory section 80, where the vector table 82 can be identified by its vector table offset 86. The vector table 82 illustrated in FIG. 6 contains a number of vectors such as vector 151, vector 152, vector 153, etc., each one of these vectors are identified by their unique vector index 90. As shown in FIG. 6, the vector 151 points to a first good code 161, vector 152 points to a second good code 162, etc. Thus, using a combination of the vector table offset 86 and the vector index 90, a bad code in ROM 14 can be replaced by any of the good code 161, 162, etc., from the multiplicity of good codes 160.

Now referring back to FIG. 5, at a block 138, the patching device 40 overwrites the data bus 20 with a command to load the program counter 74 with the value of the first vector 84, as calculated at the block 136. An example of such a command may be, "LDR PC, [PC, #-(276−4*(vector index 90)+4*(vector table offset 86)]." If the value of base 88 is 0x0000_000C, then such a command will cause the program counter 74 to be loaded with a vector located at 0xFFFF_FF00+4*(vector index 90). Subsequently at a block 140, an address of the good code stored in such a vector located at 0xFFFF_FF00+4*(vector index 90).

At this point, the patching device 40 starts to prepare executing a good code, starting at the block 118 of FIG. 4. As can be seen from the illustration above, the patching device 40 can be used to replace a bad code within a ROM, or other non-volatile memory with a good code within RAM or other memory devices. Event though in the above examples, a code or data residing on a non-volatile memory is replaced, in practice, even code or data residing on a volatile memory can be replaced by using a patching device or a patching method described above.

In the foregoing specification the present patent has been described with reference to specific embodiments. However, one of ordinary skill in the art will appreciate that various modifications and changes can be made to these embodiments without departing from the scope of the present patent as set forth in the claims below. Accordingly, the specification and figures are to be regarded in an illustrative rather than in a restrictive sense, and all such modifications are intended to be included within the scope of the present patent.

What is claimed is:

1. A method of applying patches to a code residing on a read only memory (ROM) to substitute execution of a first code residing at a first address in the ROM with execution of a second code residing at a second address within a memory map, the method comprising:

storing the first address of the first code in a first register;

pre-fetching a first instruction;

comparing an address of the first instruction with the first address of the first code;

issuing a pre-fetch abort instruction if the address of the first instruction matches the address of the first code; and fetching the second address of the second code.

2. A method as described in claim 1, wherein fetching the second address of the second code comprises:

loading a program counter with a first vector that contains the second address of the second code; and reading the second address of the second code from a location pointed by the first vector.

3. A method as described in claim 2, wherein loading the program counter with the first vector comprises:

reading a vector table offset from a second register, where the vector table offset specifies an offset of a vector table comprising a number of vectors;

reading a vector index from a third register, where the vector index specifies an offset of the first vector within the vector table;

determining a value of the first vector using the vector table offset and the vector index; and overwriting a data bus with a command to load the program counter with the first vector.

4. A method as described in claim 3, further comprising:

saving the content of a first number of current status registers to a first number of saved status registers; and executing the second code.

5. A method as described in claim 4, further comprising:

restoring the content of the first number of saved status registers to the corresponding first number of current status registers at the completion of an execution of the second code; and executing a routine in the ROM following the first code.

6. A method as described in claim 5, implemented using a 32-bit advanced reduced instruction set code (RISC) machine (ARM) processor.

7. A method as described in claim 1, wherein fetching the location of the second code comprises:

storing the location of the second code in a second register; and running a handler routine to read the location of the second code from the second register.

8. A method of applying patches to a read only memory (ROM) to substitute a first set of data residing at a first address in the ROM with a second set of data residing at a second address within a memory map, the method comprising:

storing the first address in a first register and the second address in a second register;

pre-fetching a first instruction;

accessing a first data from the ROM residing at a third address;

comparing the third address with the first address; and overwriting a data bus with the second address if the third address matches the first address.

9. A method as described in claim 8, wherein the first set of data resides on a non-volatile memory.

10. A method as described in claim 9, wherein the non-volatile memory is a read only memory (ROM).

11. A system for applying patches to a code residing on a read only memory (ROM) to substitute execution of a first code residing at a first address in the ROM with execution of a second code residing at a second address within a patch memory, the system comprising:

a first register to store the first address of the first code;

a comparator to compare the first address of the first code with an address of a first instruction in the ROM; and a processor adapted to pre-fetch the first instruction, to input the address of the first instruction into the comparator, to generate a pre-fetch abort if the address of the first instruction matches the address of the first code, and to fetch the second address of the second code.

12. A system as described in claim 11, wherein the processor comprises:

a program counter to store a first vector containing the second address of the second code, a first logic circuit to load the first vector into the program counter; and a second logic circuit to read the second address of the second code from a location pointed by the first vector.

13. A system as described in claim 12, further comprising:

a second register to store a vector table offset specifying an offset of a vector table comprising a number of vectors;

a third register to store a vector index specifying an offset of the first vector within the vector table;

a third logic circuit to determine a value of the first vector using the vector table offset and the vector index; and a fourth logic circuit to overwrite a data bus with a command to load the program counter with the first vector.

14. A system as described in claim 13, wherein the processor is further adapted to save a content of a first number of current status registers to a first number of saved status registers, and to execute the second code.

15. A system as described in claim 14, wherein the processor is further adapted to restore the content of a first number of saved status registers to a corresponding first number of current status registers at the completion of an execution of the second code and to execute a routine in the ROM patching following the first code.

16. A system as described in claim 15, wherein the processor is a 32-bit advanced reduced instruction set code (RISC) machine (ARM) processor.

17. A system as described in claim 15, wherein the vector table is located in a random access memory (RAM).

18. A system as described in claim 15, wherein the processor is adapted to pre-fetch the first instruction at least two cycles before it executes the second code.

19. A system for applying patches to a read only memory (ROM) to substitute a first set of data residing at a first address in the ROM with a second set of data residing at a second address within a patch memory, the system comprising:

a first register to store the first address of the first set of data;

a comparator to compare the first address of a first data from the ROM with the address of the first set of data; and a processor adapted to pre-fetch the first data from the ROM, to input the address of the first data into the comparator, to generate a pre-fetch abort if the address of the first data matches the address of the first set of data, and to fetch the second address of the second set of data.

20. A system as described in claim 19, wherein the processor comprises:

a program counter to store a first vector containing the second address of the second set of data, a first logic circuit to load the second vector into the program counter; and a second logic circuit to read the second address of the second code from a location pointed by the first vector.

* * * * *